United States Patent [19]
Sola

[11] 3,854,859
[45] Dec. 17, 1974

[54] SHAPING HEAD FOR PLASTIC MOLDING MACHINES

[76] Inventor: Manuel Mamerto Sola, Billinghurst 1850, piso 5, dto. B-Buenos Aires, Argentina

[22] Filed: Oct. 19, 1972

[21] Appl. No.: 298,011

[52] U.S. Cl. .............................. 425/466, 425/381
[51] Int. Cl. ............................................. B29f 3/04
[58] Field of Search .................... 425/141, 381, 466; 264/167, 214

[56] References Cited
UNITED STATES PATENTS

| | | | |
|---|---|---|---|
| 3,195,183 | 7/1965 | Phillips | 425/466 |
| 3,572,257 | 3/1971 | Minor et al. | 425/381 X |
| 3,680,997 | 8/1972 | Dukert et al. | 425/381 |

*Primary Examiner*—R. Spencer Annear

[57] ABSTRACT

A shaping head for machines for extrusion-molding plastic articles. The head has an inner channel of rectangular section and substantially flat faced walls, one of which is defined by a plurality of sectionalized plates adapted to enter into a passage and movable between raised and lowered positions, so that said passage may be totally or partially closed. With this head a sheet of plastic material can be manufactured, with a number of ribs, which will be equally spaced or not, having the same or different heights, at will, and even including intermediate flat sections covering various sections of the sheet. Besides, weakening channels may be included to facilitate the plying of the sheet.

5 Claims, 9 Drawing Figures

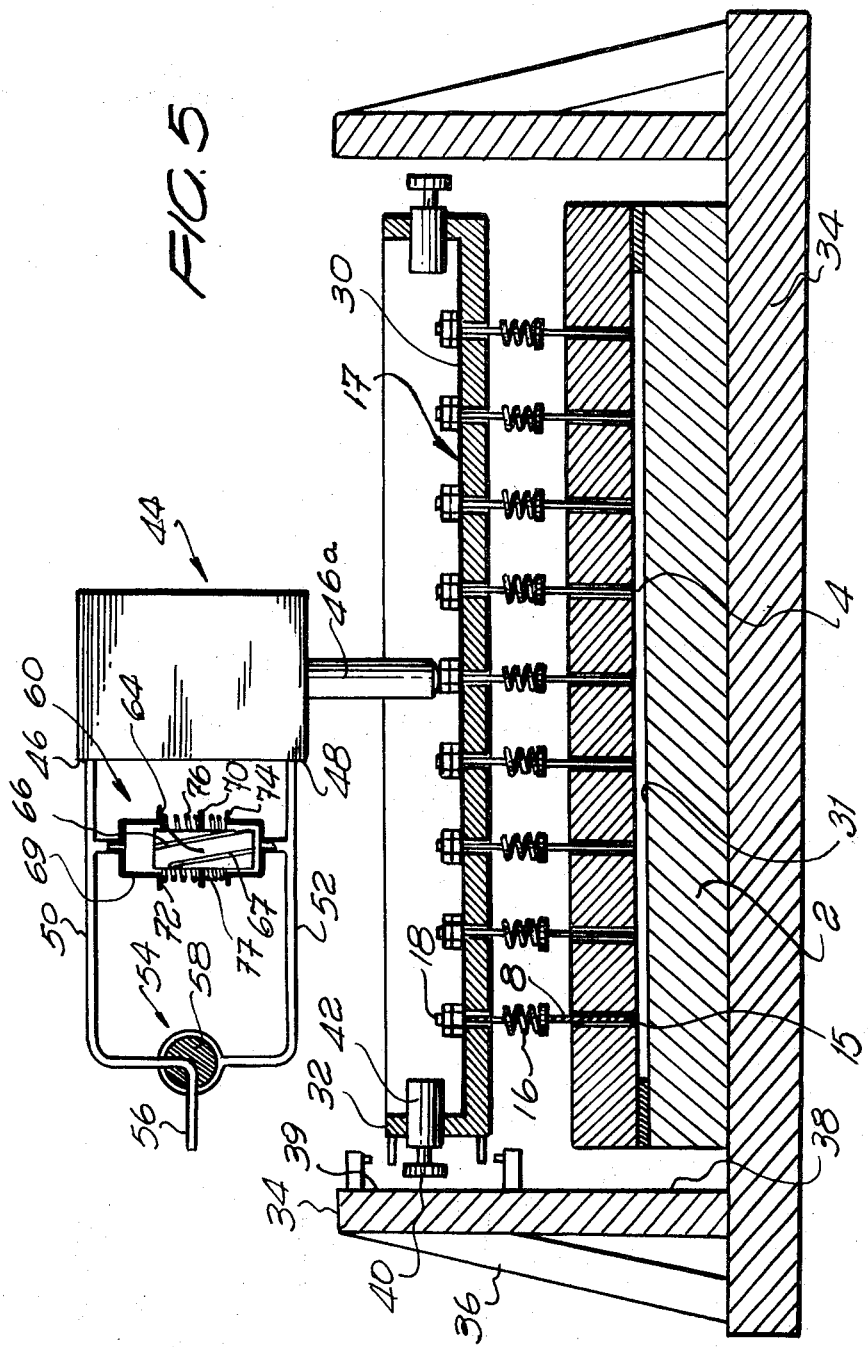

SHAPING HEAD FOR PLASTIC MOLDING MACHINES

This invention relates to an improvement in a shaping head which is particularly adapted to be used in extrusion molding machines or systems for thermoplastic materials.

It is known from Argentine Pat. No. 184,129 to use a shaping head with continuous extrusion machines for molding plastic articles. These known machines include a heated cylinder into one end of which the plastic material in powder or granular form is fed, and thereafter pushed lengthwise therealong by a screw member, up to the other end of the heated cylinder.

During displacement of the material, it is submitted to attrition and compression against the cylinder walls, due to which its temperature is raised so that it reaches a fluid state whereby it can adopt the shape of the mold or die located at the extrusion outlet. By cooling the material during passage through the die its shape will be made permanent.

The shaping head of this invention which is adapted to this continuous production-machine or to a similar machine, is in fact a die adapted to shape the plastic material which is extruded by the machine, into a predetermined permanent form.

The fundamental quality of the shaping head of the present invention lies in that it can provide a sheet of plastic material with a number of ribs, which can be equally spaced, have the same or different heights, at will, and even include intermediate flat sections covering various portions of the sheet. Besides, weakening channels may be included to facilitate plying of the sheet according to its later use.

Therefore, the provision of a particular shaping head is the basic object of this invention.

It is important to note that the position of the moving elements of the sectionalized plate with which the shaping head according to this invention is provided, is adapted to be manually mechanically or electromechanically changed at will in a sequential or alternating order, so that production can be automatically planned either as a function of time, number of articles or size.

To this end, the shaping head which will be more precisely described below, is characterized by the fact that it has an inner channel of rectangular section and substantially flat faces walls; this channel is in communication with a number of spaced apart passages defined at least in one of the main walls of the channel; in each one of said walls there is a movably mounted plate, the thickness of this plate being set in relation to the associated passage, so that it may be displaced between a position in which the passage is absolutely free and another position in which it is blocked by engagement of the bottom edge of the plate with the opposite face of said channel.

The above mentioned and other features and objects of this invention and the manner of attaining them, will become more apparent and the invention itself will be best understood by reference to the following description of an embodiment of the invention taken in conjunction with the accompanying drawings wherein:

FIG. 5 is a section of the shaping head of FIG. 2 taken along axis V—V of FIG. 4, and shows some details of the hydraulic operating mechanism associated therewith;

In the various figures, the same reference numbers have been used for identical or similar parts.

Figure 1:
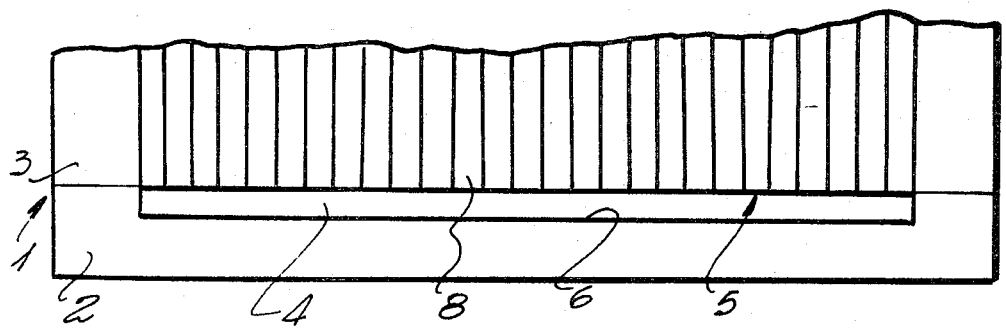
FIG. 1 is a schematic cross section of the shaping head of the present invention.
Figure 2:
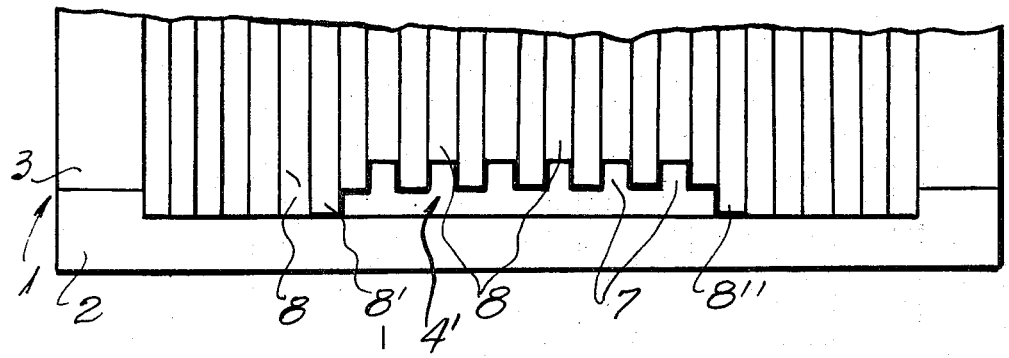
FIG. 2 is a similar schematic cross section of the same device but having some plates slightly displaced so as to limit the width of the article to be molded.
Figure 3:
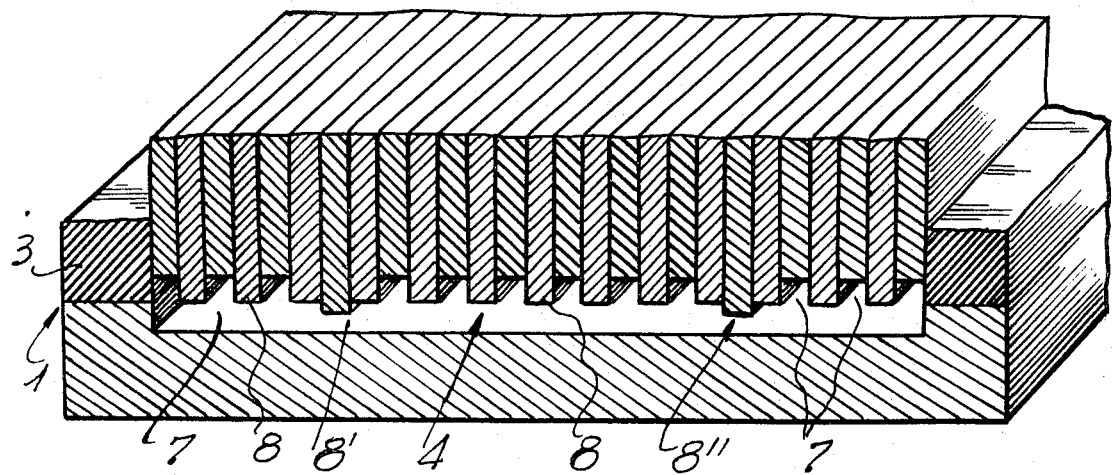
FIG. 3 is a perspective view, partially in section, of the shaping head with all plates in an alternative molding position.

Referring more particularly to FIGS. 1 to 3 of the enclosed drawings, reference 1 corresponds in general to the shaping head which comprises two or more metal members 2–3 which are juxtaposed and fixed to define an inner channel 4 of rectangular cross-section.

The faces 5–6 of the walls of this channel are essentially flat. However a number of passages 7 communicating with the above mentioned channel 4, are defined in the wall having upper face 5.

Passages 7 may be equally spaced and their number may be selected at will.

The fundamental aspect of this embodiment of the invention is that each passage 7 is provided with an associated plate 8 of a thickness adapted to the width of the passage and with a height that may be altered and adapted to varying circumstances.

In this respect, each one of these plates may be upwardly or downwardly moved, so as to restrict, block or facilitate the passage of the plastic material through passages 7 and, eventually, in part through the internal channel 4, as will be seen further on.

These plates are separately, jointly, alternatively and selectively displaceable by means of any type of control means independent or synchronized with the production rate of the machine.

Essentially, this head 1 is adapted to produce plastic material sheets which, on one or both faces, are ribbed, the ribs been continuous or divided in discrete sections, in accordance with the latter use of the sheet.

With reference now to FIGS. 1, 2 and 3, it will be seen that by individually raising or lowering plates 8, so that they extend to a larger or lesser degree into slots 7, it is possible to vary the cross section of channel 4. In addition, by lowering two spaced apart plates such as 8', 8" so that they contact face 6, it is possible to restrict the width of channel 4 so as to define channel 4'. In this way, a resultant product of varied cross section can be obtained.

On the other hand, and as shown in FIG. 3, plates 8', 8" could be only partially lowered, in which case the resultant molded article will have two open weakening-channels, in addition to the ribs defined by the remainder of the plates.

Figure 4:
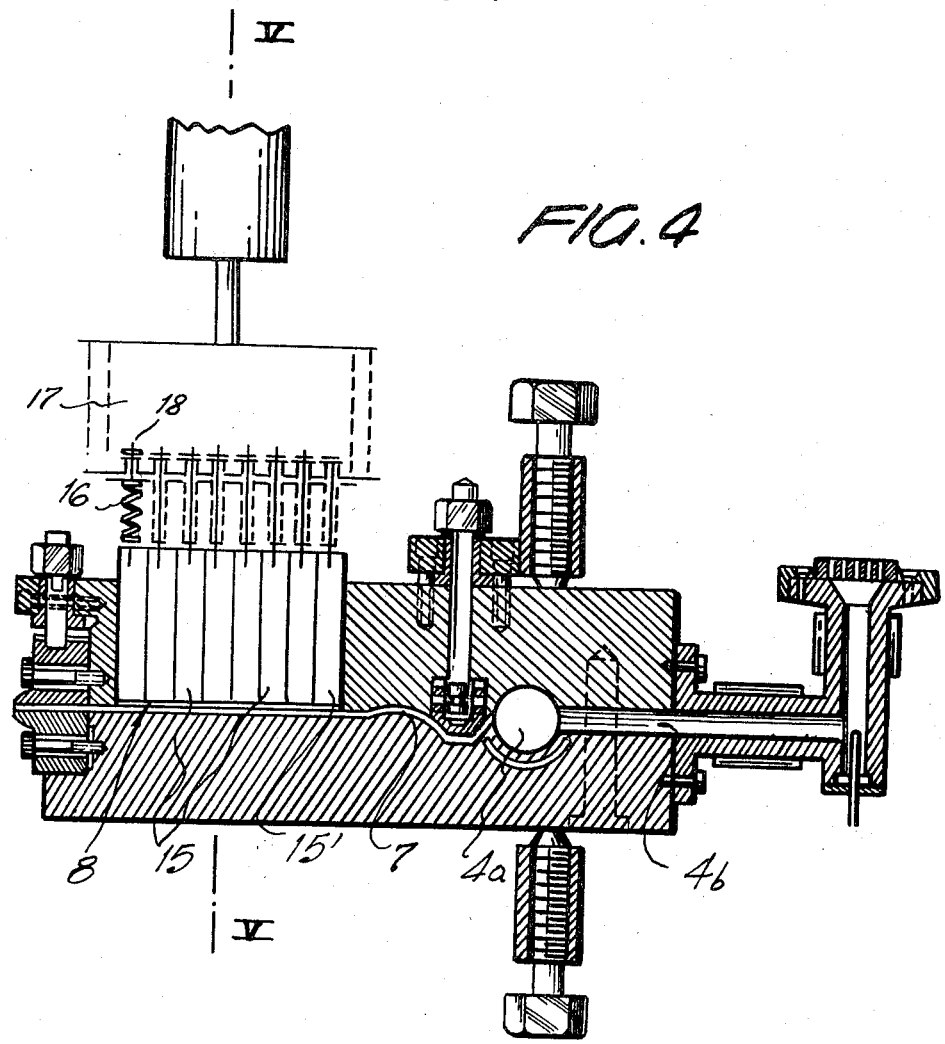
FIG. 4 is a longitudinal section taken along axis IV—IV of FIG. 2 and shows the shaping head of the present invention with its sectionalized plates.

Refering now to FIG. 4, each plate 8 is formed by a number of smaller plate sections 15, which in combination perform the same function as a plate, but in gradual manner. In this respect, when a composite plate is imparted a downward movement each section will descend individually to a position determined by the downward force acting thereon and by the upward reaction of the plastic material thereunder.

To this effect, each section is connected through springs 16 to a rigid body member 17 which upon effecting a downward movement urges each section downwardly. However, only those sections which are located in those areas where the plastic material is in a heated and therefore fluid condition (adjacent the entrance to the die head), will descend, partially blocking the path of the material and thereby forming a ribless plate. As this plate continues to advance, the following plate members will be able to descend. It is precisely this desired individual movement of the sections which is obtained by the head of the present invention.

It may be seen from FIG. 4 that the plate sections forming the die in combination with the bottom face 31, the uper face 31' and the side plates 39 (FIG. 5) are separately supported by threaded rods 18 to control the pressure of the springs against the plate sections, said pressure being variable by means of nuts in accordance with the characteristics of the material to be treated which should not be damaged or improperly treated during the molding process. However it should be blocked within the time allowed for it to get a faultless surface which is programmed by the die cooling.

FIG. 5 of the drawings is a section along line V—V of FIG. 4 showing a rigid body 17 shaped as a platform including a flat bare section 30 and a flange section 32. This rigid body 17 is moved along appropriate guide means, not shown in the drawings, in a vertical direction and is located above a base 34 above which there is arranged a table 2 having the channel 4 defined therein and in which the plastic material is molded by extrusion. The plates 8 adapted to effect the molding operation as above explained are shown, as well as threaded rods 18 and springs 16.

The rigid body 17 moves between a pair of laterally arranged braking surfaces 39 which are very rigid and besides are reinforced by the members 36. The inside surface 38 of each wall 34 si lined in a section 39 by a high friction material against which operates a braking shoe 40 operated by a solenoid 42. This arrangement is repeated at the other side of the rigid body 17.

Rigid body 17 is operated by a hydraulic ram 44 comprising a piston rod 46a fixed to the base 30 of the rigid body 17. Hydraulic ram 44 has two inlets 46–48 located above and below its piston, which is not shown on the drawings, said inlets being in communication with the lines 50 and 52 connected to a bidirectional valve 54 enabling the application of the pressure of line 56 either to line 50 to line 52 according to the position of the cylinder 58 of valve 54.

To be able to cause a sudden interruption of the presure at lines 50 or 52 so that the hydraulic device 44 stops dead with high precision, a differential valve 60 is provided. This valve has a cylinder 69 within which a piston 74 is freely movable, this piston having two channels 66, 67 communicating each one of the piston heads with a point of the cylindrical surface of said piston located in the proximity of the opposite head. This piston 64 has a flange 70 while the cylinder 62 has the flanges 72 and 74. Between the flange 70 and both flanges 72 and 74 there are arranged compression springs 76 and 77 which tend to keep the piston centered within the cylinder 62. When pressure is applied, e.g., to the upper head of the piston 64, the latter moves down and as soon as channel 67 is put in communication with atmosphere, the pressure applied to the lower head is totally vented, so that the hydraulic device 44 causes a sudden lowering of the rod 46a. This action is even quicker due to the operation of the braking shoes 40 actuated by the solenoids 42. In fact, each time that it is desired to displace piston 44, the braking action is relieved by an electric circuit into which solenoids 42 are connected enabling the upward or downward movement of the rigid body 17. As soon as the hydraulic action of the ram 44 ceases, and body 17 stops moving the braking shoes 40 fix the position of the member 17 and therefore the position of plates 8.

These electromechanical elements adapted to control the operation of the plates through a pneumatic or hydraulic mechanism, its position being fixed through the electromagnetic shoes 40, may be controlled through a photocell system adapted to order the repetition of the molding of the contour emerging from the mouth of the die or shaping head through the operation of the electro pneumatic valve acting upon the pressure differencial cylinder 62 which in combination with these plates, each one of which is formed by several smaller plate sections, has performed the molding process.

The above mentioned photocell system is located on a support next to the mouth of the die or shaping head, which operates as a receiver for the molded element and is crossed by a beam of light of the photoelectric system. Said beam of light will be intermittently interrupted in accordance with the molding programs; this successive and automatic interruption being controlled by a template passing in a first and sole opportunity through the photo electric system in syncronism with the starting of the molding process.

However, considering the importance of the application of the head 1 to get ribbed sheets, it may be added that these will be used primarily as a substitute for corrugated cardboard and wood in the manufacture of containers as they solve all the problems proper of the weak supporting structure of the corrugated cardboard and the septic qualities of wood for the transport of some foodstuffs, as meat, for example, which under the existing regulations cannot be shipped in this kind of containers. This means that the use of plastic materials should avoid many losses in the food during transport and the transport will be made in better conditions.

This change of material in the manufacture of containers has been tried in other opportunities but without success due to the high cost of such containers, even when then can be re-used, and this is the reason why their utilization has not be enforced. On the contrary, being given the low costs of this equipment, the reduced amount of the fixed investment that is required, the reduced labour and material that is necessary, in relation with other systems, the use of this invention will enable to recover all costs in just one trip of the box in question which can be discarded by the user, as its cost is of the order of the cardboard or wooden box. In relation with the possible shapes that can be given to a molded article, it may be said that it could be totally flat at one face and totally or partially ribbed at the opposite face, or else to be ribbed at both faces, or even it can be provided with elongated slots for the bending of the box when it; has to be so provided.

It is obvious that said slots could also be obtained through an appropriate operation of the plates 8, the total length of which fixes the distance between the end of each rib and the begining of the next coaxially aligned rib.

It is equally important to note that the shaping head of this invention is adapted to the manufacture of containers for freezed foodstuff, of the type having a prismatic body which comprises side faces and a bottom face and a detachable cover with the characteristic that all sides should be provided at one face with the number of mold ribs shaping the inner part of the container but unable to support the freezed product which however is totally and directly supported against the cover, which eliminates all voids that difficult a good, quick and economically freezing.

Besides, these sides with small ribs solve the problems that in the modern system of "contact" freezing is found when it is applied to the known containers, being given their very thin walls, the lack of voids, which are only necessary when shipping chilled but not freezed foodstuff, and the resiliency of the walls that aids to solve problems of contact with the freezing equipment. In this way, the efficiency of the machine is increased and the cost is reduced, at the same time that the assurance of a better freezing of the foodstuff is insured.

Figure 6:
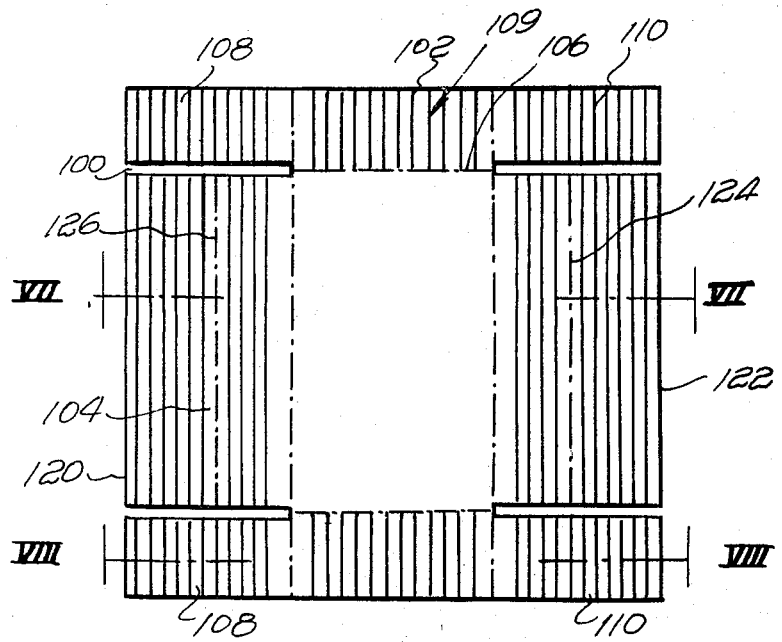
FIG. 6 is a plan view of a plastic article manufactured with the shaping head of this invention; this plastic article can be used in turn to manufacture a plastic container.
Figure 7:
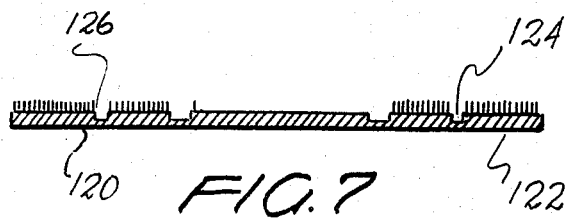
FIG. 7 is a section taken along axis VII—VII of FIG. 6.
Figure 8:
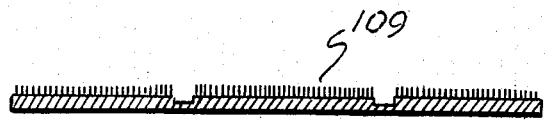
FIG. 8 is a section taken along axis VIII—VIII of FIG. 6.

FIG. 6 shows one of the many forms of the articles manufactured by the device of this invention. It is a flattened box in the form in which it leaves the machine showing slots 100, ribs 102 that have been drawn with solid lines and weakening zones 104 shown as dashed lines where the material thickness has been reduced. The object of the ribs is to make the box more rigid while the slots 100 enable the box to adopt its final shape. FIGS. 7 and 8 show in an exaggerated way the thickness at the different sections of the article shown in FIG. 6.

Figure 9:
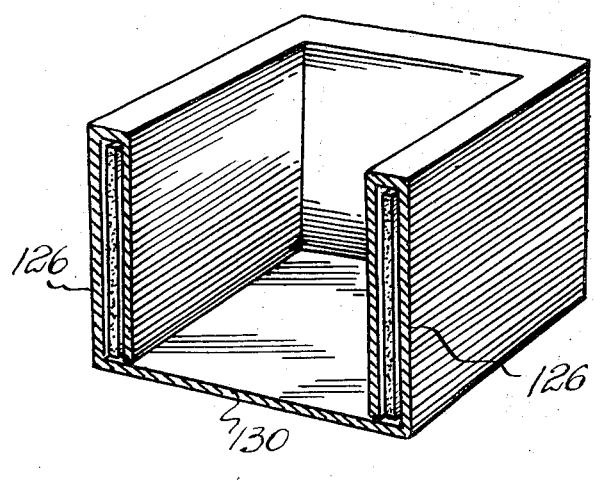
FIG. 9 is a perspective view partially in section of a box manufactured with the plastic article shown in FIGS. 6, 7 and 8.

To obtain the box as shown in FIG. 8, the flat article is first bent at the weakening lines 106 so that sections 108, 109 and 110 will be perpendicular to the rest of the box. Then the flaps 108 and 110 are bent inwards. Then, sections 120 and 122 are bent so that they will be juxtaposed with flaps 108 and 110 and are bent again following the weakening lines 124 and 126 so that a box if finally provided in which the longer sides have a great strength because they are comprised of three layers, i.e., the flaps 110 and twice the thickness of the flaps 120 and 122. This is clearly shown in FIG. 9 showing the section 126 of both sides with three thicknesses and the bottom 130 with a single thickness. Besides, the middle layer of the box has the ribs arranged perpendicularlly to the base 130, while the inner and outer layers have longitudinal ribs. Rigidity in both directions is thus obtained. The thinner bottom 130 enables the contact freezing of the box contents. The bottom thickness may be very small, e.g., 0.5 milimeter.

As a further improvement of the device of this invention with a view to distribute the plastic material through the very wide sheet to be extruded, a shaft may be located in a bore 4a (FIG. 4) perpendicular to the channel 4b of admission of the plastic to the shaping head. This shaft has two helilcal gooves of opposite senses starting from the center of said shaft.

This shaft can be removed easily while the material is melted, thanks to the use of two end bushings.

Also the plates used for shaping the articles may have various shapes adapted to secure a variety of forms, and also can be made of various materials adapted to particular needs.

I claim:

1. In a shaping head for extrusion molding plastic articles an inner channel having a rectangular section and substantially flat faced walls, a number of longitudinally oriented, spaced slots through at least one of the faces of said inner channel, a plate of a width to sealingly fit the slot being arranged in each one of said slots, said plate being adapted to be displaced between a first position in which the slot has its maximum height to a second position in which said slot is inoperative because said plate's edge engages the opposite face of said channel, and wherein each one of said plates is comprised of several mutually independent plate sections which are engaged at their edges, and each one of said plate sections is associated with a common control that enables each unit to resiliently and separately yield.

2. A shaping head as claimed in the above claim wherein a separate control is associated to each one of said plates.

3. A shaping head as claimed in claim 1 wherein a common control is associated with all plates.

4. A shaping head as claimed in claims 1 and 3, wherein said common control of said plates includes a mechanism which is synchronized with the machine production gear, to so displace said plates jointly or alternatively and selectively.

5. A shaping head as claimed in claim 1 wherein said common control is adapted to independently and selectively act upon said plate sections.

* * * * *